United States Patent [19]

Bertram

[11] 4,126,155
[45] Nov. 21, 1978

[54] VALVE PISTON FOR HYDRAULIC CONTROL VALVE

[75] Inventor: Claus Bertram, Waltrop, Fed. Rep. of Germany

[73] Assignee: O & K Orenstein & Koppel Aktiengesellschaft, Berlin, Fed. Rep. of Germany

[21] Appl. No.: 751,078

[22] Filed: Dec. 16, 1976

[30] Foreign Application Priority Data

Dec. 19, 1975 [DE] Fed. Rep. of Germany ....... 2557235

[51] Int. Cl.² .................... F16K 11/07; F16K 39/04
[52] U.S. Cl. .................... 137/625.69; 251/324; 251/282
[58] Field of Search ............ 137/625.3, 625.69; 251/324, 325, 121, 282

[56] References Cited

U.S. PATENT DOCUMENTS

| | | | |
|---|---|---|---|
| 3,123,335 | 3/1964 | Darling | 251/325 |
| 3,747,642 | 7/1973 | Tolbert, Jr. | 137/625.69 |

Primary Examiner—Martin P. Schwadron
Assistant Examiner—A. Michael Chambers
Attorney, Agent, or Firm—Walter Becker

[57] ABSTRACT

A valve piston for a hydraulic control valve in which the valve piston has piston sections thereon in axially spaced relation interconnected by a reduced diameter portion with at least one piston section having passage means formed on at least one end in diametrally opposite positions and taking the form of a notch formed into the end of the piston and having a concave axially bottom region with a flow body mounted in the notch and defining therewith an arcuate recess forming one end of the passage means and opening radially and axially outwardly near the periphery of the piston section while the other end of the passage means opens axially from the piston at a radially inner region thereof. The flow body and the notch define the passage means and which terminates at the periphery of the piston in a throttling region that directs fluid along an outwardly inclined path toward the respective end of the piston section.

5 Claims, 4 Drawing Figures

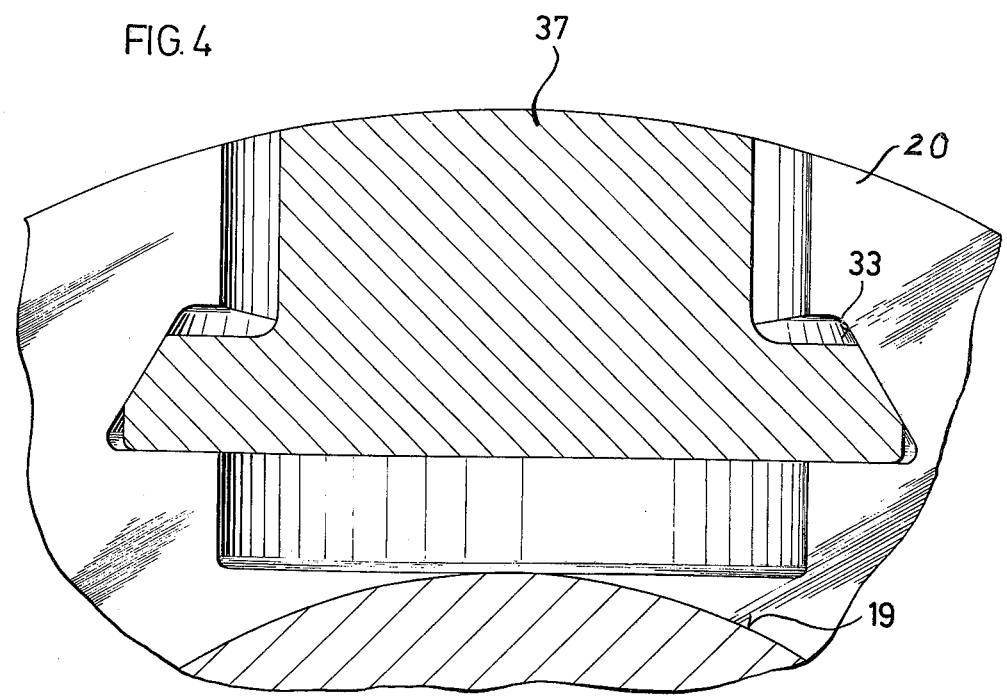

VALVE PISTON FOR HYDRAULIC CONTROL VALVE

The present invention concerns a valve piston for hydraulic control valves with piston sections which at their end faces are provided with fine control grooves located opposite to each other, while annular grooves and fine control grooves interconnect the connecting passages arranged for the flow medium which passages are arranged in the control housing 1 and while pivots are arranged in said fine control grooves.

With a heretofore known arrangement (German Offenlegungsschrift 22 48 891), throttle notches are provided at the end of a piston section and are located adjacent a circumferential groove. These throttle notches open toward the outside and toward the mantle surface of the valve piston and also open at the end face axially toward the circumferential groove. Connected to the bottom surface of the notch is a pivot which at uniform coaxial distance opposite the side walls of the notch points outwardly. Furthermore, the pivot is outwardly tilted by an angle of at least 30° relative to the piston rod axis. According to this solution the intended purpose, namely, to keep the axial component small, is accomplished as long as the edge opening is small. With a larger edge opening up to the point when the pivot becomes effective, the directional effect upon the oil flow is lost and consequently the optimum reduction of the reaction forces by the piston movement in the entire fine control range is not obtained. This drawback is all the more serious the greater the oil flow and the inherently greater dimensions of the valve piston are.

It is, therefore, an object of the present invention to provide a valve piston for hydraulic control valves of the above mentioned type which will avoid the above mentioned drawbacks and can also with a medium under high pressure which flows around the piston in great quantities, be actuated with a minimum of power over the entire displacement stroke.

These and other objects and advantages of the invention will appear more clearly from the following specification in connection with the accompanying drawings, in which:

FIG. 4 is a front view of the flow body with a partial section through the valve piston.

Figure 1:
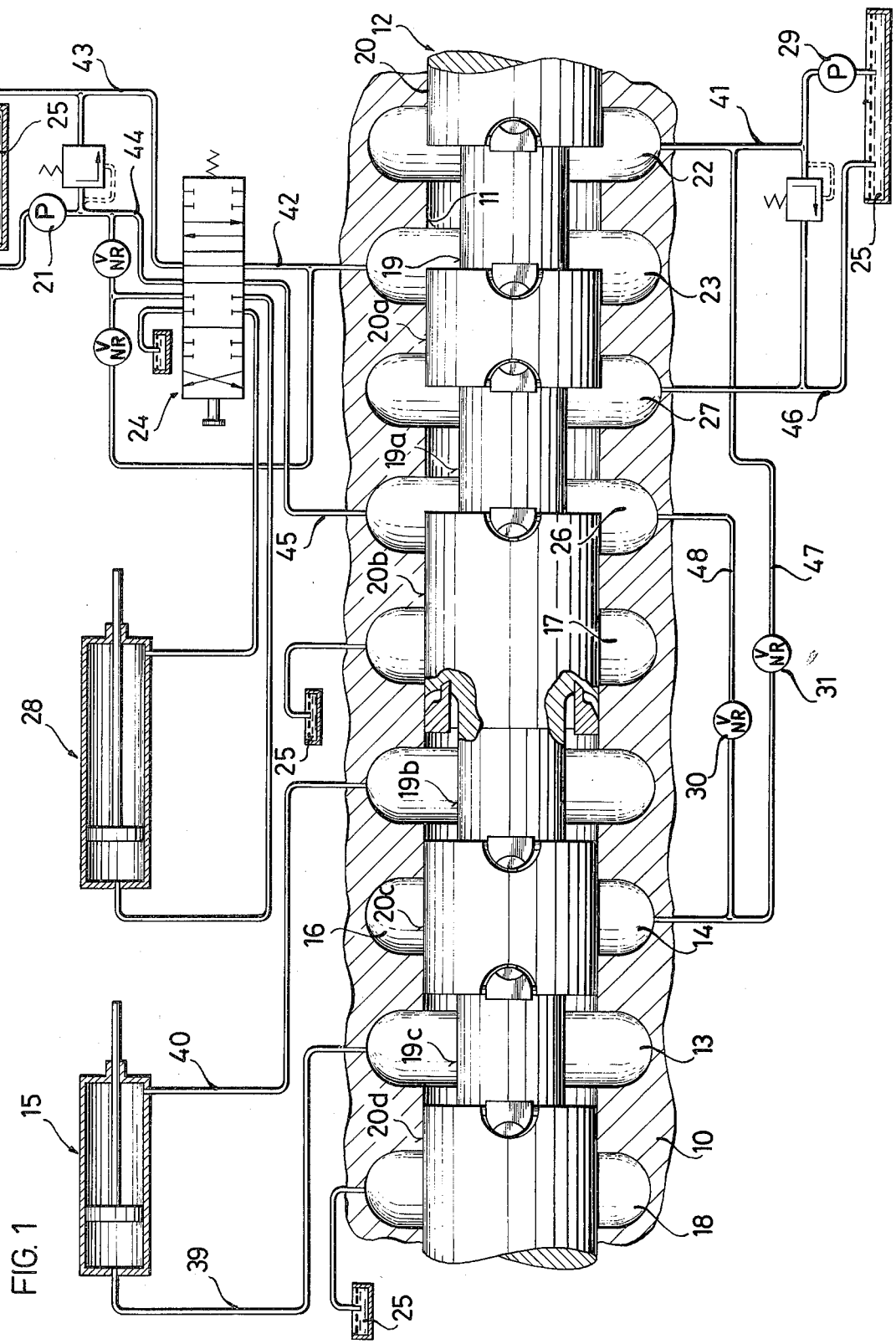
FIG. 1 shows a longitudinal section through a hydraulic control valve with the valve piston according to the invention in its neutral position.

The valve piston according to the present invention is characterized primarily in that the lateral surfaces of the fine control grooves open semi-circularly with regard to the mantle surface of the valve piston and quadrilaterally toward the end face of the annular groove. The valve piston according to the present invention is furthermore characterized in that the end wall of the fine control grooves is provided with a concave milled-in portion while the flow body is provided with an inclined surface which forms a throttling area and is directed toward the end face of the fine control groove.

Said flow body is eccentrically arranged in the fine control groove in such a way that the radial mantle surface of the flow body and the mantle surface of the piston section have the same diameter.

Referring now to the drawings in detail, a housing 10 of a control valve for controlling a hydraulic pressure medium is provided with a bore 11 in which the valve piston 12 is by actuation from the outside axially displaceable from the illustrated neutral position to its working position. This displacement is effected in such a way that, depending on the position of the valve, one of the two consumer passages 13, 14 through conduits 39 or 40 supplies a working device 15 with a pressure medium through the feeding passage 16, whereas the respective pertaining other passage 14, 13 communicates with the return passage 17, 18 respectively. Arranged on the valve piston 12 are the piston sections 20-20d separated from each other by annular grooves 19-19c.

In the position of the valve shown in FIG. 1, a free circulation of the fluid medium exists so that the pressure medium delivered by the pump 29 will through conduits 41 pass into the inlet passage 22, from there through the annular grooves 19 into the transfer passages 23, and from there through conduit 42 into a second not actuated control valve 24 which is arranged in parallel, and from control valve 24 flows through the conduit 43 into the tank 25.

The pressure medium delivered by the pump 21 in an analogous manner passes through conduit 44 into control valve 24 occupying its neutral position, and from there passes through conduit 45 into the transfer passage 26, and from the latter through the annular groove 19a into the outlet passage 27 which latter through conduit 46 communicates with the tank 25. In this neutral position, the piston sections 20d, 20c and 20b block the consumer passages 13 and 14 and the feeding passage 16 against the pertaining return flow passages 17 and 18.

The illustrated embodiment of the valve piston 12 permits a double actuation of the working devices 15 or 28 when one of the two valve pistons is actuated, for instance the valve piston 12, inasmuch as the pressure fluid delivered by the pump 29 passes through conduit 41 into the branch conduit 47 and from there through the check valve 31 into the feeding passage 16. On the other hand, the pressure medium delivered by the pump 21 passes through the conduits 44 and 45 into the transfer passage 26 and then flows through the conduit 48 through the check valve 30 likewise into the feeding passage 16. From here the pressure medium of both pumps passes through the annular groove 19c and 19b, respectively (depending on the control position) into the working device 15. In the end position of the valve piston 12, the passages 22, 23, 26 and 27 are by the piston sections 20, 20a and 20b blocked relative to the tank 25. When only the control valve 24 is actuated, the working device 28 can in a manner analogous to the above description be actuated in both directions.

Figure 2:
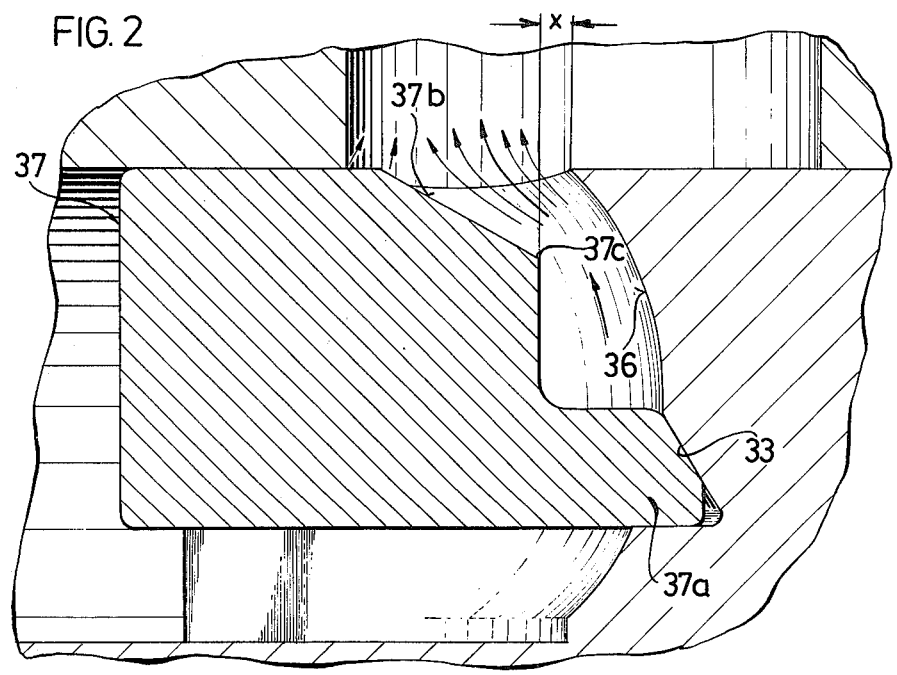
FIG. 2 represents a longitudinal section through the flow body with a partial section through the valve piston in its throttling position.
Figure 3:
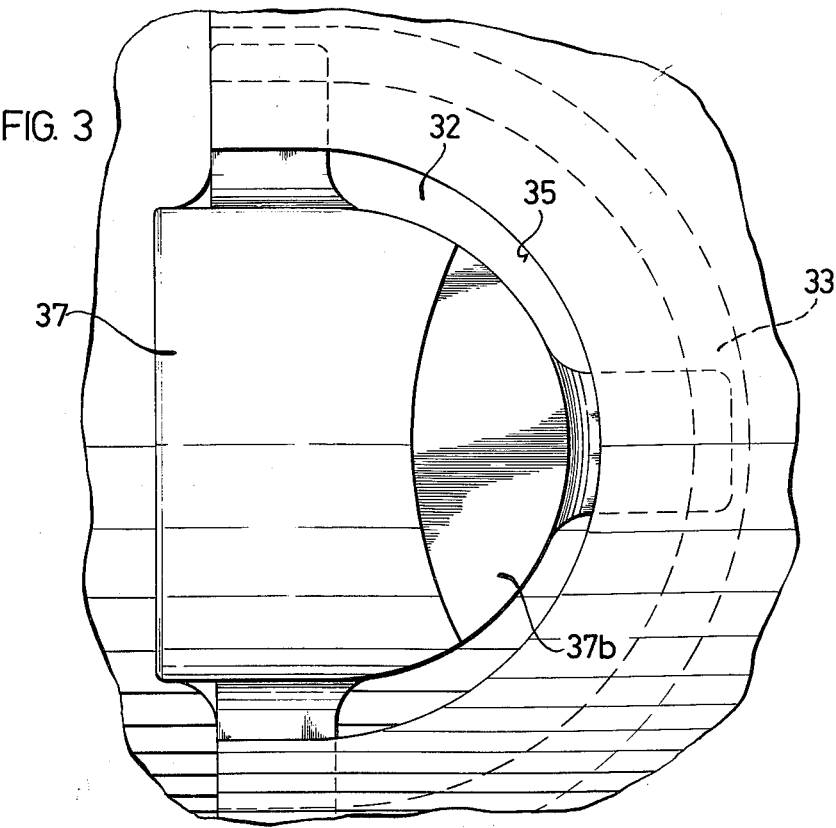
FIG. 3 is a top view of the fine control groove with inserted flow body.

At the ends of the piston sections 20, 20a, 20b, 20c and 20d, fine control grooves 32 are provided which are radially offset relative to each other by 180°. The fine control grooves comprise a semi-circular recess 35 which within the region of its zenith point additionally has a spherical recess 36. Furthermore, the recess 35 is provided with a dovetailed milled out portion 33. By means of webs 37a consisting of one piece with flow body 37 and arranged on the circumference, the flow body 37 is inserted into the dovetailed milled out portion 33. By dot welding, the flow body 37 is secured in the fine control groove 35 against axial displacement. This connection may also be effected in a different way for instance by soldering. On that side of the flow body 37 which faces toward the vertex of the fine control groove 32, the flow body 37 is provided with an inclined surface 37b in such a way that a nozzle-like constriction is formed on that edge 37c which faces toward the fine control groove 32. By means of said constriction, the pressure medium flow exiting from the valve piston 12 into the housing 10, receives a directional action or deviation and exerts a recoil impulse upon the valve piston 12. To obtain the desired flow conditions, distance x as shown in FIG. 2 is preferably not greater than about 1 millimeter.

As will be evident from the above, the arrangement according to the invention brings about the advantage of a considerable reduction in the axial forces which advantage is due to the optimum precise adaptation of the fine control groove to the flow body which is inserted thereinto and the inclination of which directed to the fine control groove forms in the latter a throttling area by means of which the pressure fluid medium exiting from the valve piston into the valve housing receives a directional impulse or deviation and furthermore exerts a recoil inpulse upon the valve piston.

It is, of course, to be understood that the present invention is, by no means, limited to the specific showing in the drawings, but also comprises any modifications within the scope of the appended claims.

What is claimed is:

1. A valve piston construction for hydraulic control valves having a valve member which has axially spaced piston sections at least one of which includes an end with diametrically opposite regions therebetween and separated from each other by annular grooves as well as a periphery interconnected by at least one reduced diameter portion and reciprocable in a bore in a valve body and which bore is provided with axially spaced annular grooves, said valve member controlling fluid flow via said bore between said grooves, said piston construction comprising in combination passage forming means located in diametrically opposite regions of the end of at least one piston section, each said passage means having one end at a radially inner region of the respective piston section end and having the other end in the form of a "U" shaped fine control groove in the periphery of the piston section radially outwardly from said one end of said passage means and having the ends opening axially from the respective piston section end, the fine control groove including lateral surfaces open semi-circularly toward the periphery of the piston and open quadrilaterally toward the end of annular grooves, an end wall of the fine control groove being provided with a milled-out portion, and a flow body having webs which engage said milled-out portions and provided with an inclined surface directed toward the end of the fine control groove and forming a well as a radial mantel surface, said flow body being eccentrically arranged in the fine control groove and being held therein in such a way that the flow body and the periphery of the piston section have the same diameter, each said passage means being formed by a notch formed into the respective piston section end and said flow body is mounted in said notch and having an inclined surface disposed in the periphery of the respective piston section, said notch extending axially into said piston section and having a bottom in the milled-out portion concave toward each piston section end, a groove extending around the inside of said notch, said flow body having webs extending into said groove to locate said flow body in said notch.

2. A valve piston construction in combination according to claim 1 in which said flow body is fitted eccentrically into said notch so the groove is provided with the throttling area most narrow in the region thereof most remote from the respective piston section end.

3. A valve piston construction in combination according to claim 2 in which said flow body has the inclined surface thereon at the end remote from the respective piston section end defining together with the concave bottom of said notch said throttling area having a flow axis inclined outwardly toward the respective piston section end.

4. A valve piston construction in combination according to claim 1 in which the flow body has a rearward end which is spaced only about one millimeter toward the respective piston end in a clearance from an edge of said notch which is most remote from the respective piston section end.

5. A valve piston construction in combination according to claim 4 in which said flow body and the bottom of said notch define a channel directed toward the respective piston section end and angularly outwardly so that fluid under pressure standing on the respective piston section end will flow through said passage means and form a fluid jet which emerges from said clearance and develops reaction forces on said valve piston construction.

* * * * *